United States Patent [19]

Ihara et al.

[11] Patent Number: 5,088,034

[45] Date of Patent: Feb. 11, 1992

[54] COMPILING METHOD FOR DETERMINING PROGRAMS TO BE EXECUTED PARALLELLY BY RESPECTIVE PROCESSORS IN A PARALLEL COMPUTER WHICH TRANSFER DATA WITH A DATA IDENTIFIER TO OTHER PROCESSORS

[75] Inventors: Sigeo Ihara, Tokorozawa; Teruo Tanaka, Hachioji; Kyoko Iwasawa; Naoki Hamanaka, both of Tokyo, all of Japan

[73] Assignee: Hitachi, Ltd., Tokyo, Japan

[21] Appl. No.: 301,648

[22] Filed: Jan. 25, 1989

[30] Foreign Application Priority Data

Jan. 29, 1988 [JP] Japan .................................. 63-17075

[51] Int. Cl.⁵ .............................................. G06F 15/16
[52] U.S. Cl. ................................... 395/700; 364/228; 364/228.7; 364/230.3; 364/DIG. 1
[58] Field of Search ... 364/200 MS File, 900 MS File, 364/736

[56] References Cited

U.S. PATENT DOCUMENTS

| | | | |
|---|---|---|---|
| 4,636,948 | 1/1987 | Gdamiec et al. | 364/200 |
| 4,885,684 | 12/1989 | Austin et al. | 364/200 |
| 4,943,912 | 7/1990 | Aoyama et al. | 364/200 |
| 4,956,800 | 9/1990 | Kametani | 364/736 |

OTHER PUBLICATIONS

Steve Reinhardt, "A Data-Flow Approach to Multitasking on CRAY X-MP Computers", ACM-0-897-91-174-1-12187-0107, (1985), pp. 107-114.
Prof. Dr. Hans Zima, "Superb: The SUPRENUM Parallelizer", Bonn University Research Report 861203, (1986), pp. 63-67.

Primary Examiner—Thomas C. Lee
Assistant Examiner—Larry Donaghue
Attorney, Agent, or Firm—Fay, Sharpe, Beall, Fagan, Minnich & McKee

[57] ABSTRACT

A compiler for generating from a serially processed type source program described in a high level language the object codes to be executed in parallel by a parallel processor system which is composed of a plurality of processors marked with respective identification numbers and in which inter-processor data transfer system for identifying data for transfer by data identifiers is adopted. The serially executed source program is first translated to programs to be executed in parallel. The inter-processor data transfer processing is extracted from the flow of processings involved in executing the programs for parallel execution resulting from the above-mentioned translation, and all the interprocessor data transfer processings are attached with data identifiers such that no overlap takes place.

7 Claims, 13 Drawing Sheets

NUMBER OF PE = 2

| PROGRAM OF PE-1 | PROGRAM OF PE-2 |
|---|---|
| DO 10 I = 2, N   ~27 | DO 10 I = 2, N   ~33 |
| CALL SEND(2, KEY, A(I-1))~28 | CALL SEND(1, KEY, B(I-1)) |
| A(I)=A(I-1)+C × RECEIVE(KEY)   ~29 | B(I)=B(I-1)+D×RECEIVE(KEY)   ~34 |
| 10 CONTINVE   ~30 | 10 CONTINVE |
| RETURN   ~31 | RETURN |
| END   ~32 | END |

FIG. 8

| PE IDENTIFICATION NO. ($i$) | 1 | 2 |
|---|---|---|
| LOOP NAME AND LOOP LENGTH OF SERIAL PROGRAM | I, 10, N-1 | 10, N-1 |
| LOOP NAME AND LOOP LENGTH HELD BY INDIVIDUAL PE | I, 10, N-1 | 10, N-1 |
| VARIABLE NAME, ARRAY NAME AND NUMBERS THEREOF HELD BY PE | A( ), N | B( ), N |
| COUNTERPART PE TO WHICH DATA OF VARIABLE OR ARRAY IS SENT FROM PE$i$ WITH SEND INSTRUCTION | A( ), N<br><br>2 | B( ), N<br><br>1 |
| IDENTIFICATION NO. OF PE FROM WHICH PE$i$ RECEIVES DATA OF VARIABLE OR ARRAY DATA WITH RECEIVE INSTRUCTION | (B( )), N<br><br>2 | (A( )), N<br><br>1 |

```
DO  10  I = 1, N  ----- LOOP LENGTH : n_3
DO  20  J = 1, N  ----- LOOP LENGTH : n_2
    SEND(Kp, KEY, X(I,J))  ⎫
    SEND(Kp, KEY, Y(I,J))  ⎬ NUMBER OF SEND
                            ⎪ INSTRUCTIONS IN
    SEND(Kp, KEY, Z(I,J))  ⎭ LOOP : n_1
         ⋮
20  CONTINUE
10  CONTINUE
```

```
PE = 1
S = 0.0
   DO 10 I=1,NS1
      S = S+A1(I)
10 CONTINUE
   DO 20 NP=2,3
      S = S+RECEIVE(KEY)
20 CONTINUE
   DO 30 NP=2,3
      CALL SEND(PE NUMBER NP, KEY, S)
30 CONTINUE
```

```
PE = 2
S = 0.0
   DO 10 I=1,NS2
      S = S+A2(I)
10 CONTINUE
   CALL SEND(PE NUMBER 1, KEY, S)
   S = RECEIVE(KEY)
```

```
PE = 3
S = 0.0
   DO 10 I=1,NS3
      S = S+A3(I)
10 CONTINUE
   CALL SEND(PE NUMBER KEY, S)
   S = RECEIVE(KEY)
```

FIG. 15

```
PE = 1
S = 0.0
   DO 10 I=1,NS1
      S = S+A1(I)
10 CONTINUE
   DO 20 NP=2,3
      S = S+RECEIVE(NP)
20 CONTINUE
   DO 30 NP=2,3
      CALL SEND(PE NUMBER NP, NP, S)
30 CONTINUE
```

```
PE = 2
S = 0.0
   DO 10 I=1,NS2
      S = S+A2(I)
10 CONTINUE
   CALL SEND(PE NUMBER 1,2,S)
   S = RECEIVE(2)
```

```
PE = 3
S = 0.0
   DO 10 I=1,NS3
      S = S+A3(I)
10 CONTINUE
   CALL SEND(PE NUMBER 1,3,S)
   S = RECEIVE(3)
```

```
   PE = 1
      N = 100
      DO 10 I=1,N
         CALL SEND(PE NUMBER 2, KEY, A(I-1))
         A(I) = A(I-1) + C x RECEIVE(KEY)
   10 CONTINUE
      DO 20 I=1,N
         J = N-I
         CALL SEND(PE NUMBER 2, KEY, A(J+1))
         A(J) = A(J+1) - E x RECEIVE(KEY)
   20 CONTINUE
```

```
   PE = 2
      N = 100
      DO 10 I=1,N
         CALL SEND(PE NUMBER 1, KEY, B(I-1))
         B(I) = B(I-1) + D x RECEIVE(KEY)
   10 CONTINUE
      DO 20 I=1,N
         J = N-I
         CALL SEND(PE NUMBER 1, KEY, B(J+1))
         B(J) = B(J+1) - F x RECEIVE(KEY)
   20 CONTINUE
```

N = 100
DO 10 I = 1, N
     CALL SEND(PE NUMBER 2, I, A(I-1))
     A(I) = A(I-1) - C X RECEIVE(I)
10   CONTINUE
DO 20 I = 1, N
     J = N - I
     CALL SEND(PE NUMBER 2, I, A(J+1))
     A(J) = A(J+1) - E X RECEIVE(I)
20   CONTINUE
```

```
PE = 2

N = 100
DO 10 I = 1, N
     CALL SEND(PE NUMBER 1, I, B(I-1))
     B(I) = B(I-1) + D X RECEIVE(I)
10   CONTINUE
DO 20 I = 1, N
     J = N - I
     CALL SEND(PE NUMBER 1, I, B(J+1))
     B(J) = BCJ-1) - F X RECEIVE(I)
20   CONTINUE
```

COMPILING METHOD FOR DETERMINING PROGRAMS TO BE EXECUTED PARALLELLY BY RESPECTIVE PROCESSORS IN A PARALLEL COMPUTER WHICH TRANSFER DATA WITH A DATA IDENTIFIER TO OTHER PROCESSORS

BACKGROUND OF THE INVENTION

The present invention relates in general to a parallel computer and more particularly to a system for generating object programs suited profitably for execution in parallel from a source program for serial execution described in a high level language.

Heretofore, in the parallel processing system such as a multiprocessor system, it is necessary for user to describe explicitly commands or instructions concerning, for example, the means for parallelization, activation of tasks, synchronization and others in a serial type source program as the user interface. In an article entitled "A Data Flow Approach to Multitasking On CRAY X-MP Computers" of "ACM-0-89791-174-1-12187-0107", pp. 107-114(1985), there are discussed a multitasking system in which four vector processors are operated in parallel and a method of commanding the multitasking operation by the user. To this end, the system is provided with a library in connection with the control of activation and synchronization of the tasks. The user is required to describe FORTRAN programs so that the library can be called for the purpose of reference. Besides, it is necessary at lower level to designate on a loop basis the means for parallelization in the form of a comment-type control statement.

In conjunction with the multiprocessor system, however, there is no proposal concerning the procedure for realizing automatically the parallelization, starting from the serial-type compile language.

On the other hand, in a parallel processing system such as shown in FIG. 2 of the accompanying drawings, the processing for executing instructions in each processor and data send processing and data receive processing among the processors are performed independently. This sort of system is described in detail in copending Japanese Patent Application No. 61-18236 filed on Aug. 1, 1986 (corresponding to U.S. patent application Ser. No. 078,656 filed on July 28, 1987). The contents of this preceding application is incorporated herein by reference. This parallel processing system features the following aspects:

(1) Referring to FIG. 2, the system of concern includes a host computer 121 and a parallel processing unit 122 which in turn is constituted by a plurality of processors 123 and a network 124 for enabling data transfer between given ones of the processors 123.

(2) Each processor 123 includes a local memory 125 for holding programs and data, an instruction processing unit 126 for executing instructions read out sequentially from the local memory 125, a sender unit 127 and a receiver unit 128.

(3) The data send processing is realized by executing a SEND instruction. When the SEND instruction is decoded, a transfer destination processor number, a data identifier and a data are placed in a register 132 incorporated in the sender unit 127 from the register designated by the operand resulting from the decoding of the SEND instruction. These three species of information of the register 132 is sent onto the network 124 as a message. The message on the network 124 is fetched as a set of the data identifier 130 and the data 131 by a reception buffer 129 incorporated in the receiver part of the processor which is identified by the transfer destination processor number contained in the message.

(4) The data receive processing is realized by executing a RECEIVE instruction. Upon decoding of the RECEIVE instruction, an identifier for retrieval is read out from a register designated by an operand resulting from the decoding, which identifier is then sent to the receiver part 128, wherein a data identifier coinciding with the identifier for the retrieval is searched from the reception buffer 129. Unless the coincident data identifier is present, arrival of the data identifier for which coincidence can occur is awaited. In case the coincident data identifier is present, this fact is informed to the instruction processing unit 126, which responds thereto by fetching the corresponding data.

Since the send processing and the receive processing are executed independent of each other, it is important to ensure definiteness or identity of the data identifier.

It is difficult to determine the data identifier only from the static structure of program. Dynamic structure of the program has to be taken into consideration.

However, there has been made no proposals concerning the procedure for automatically generating the data identifier in realizing automatic parallelization of the serial type compile language for the parallel computer.

In the prior art system described above, no consideration is paid to the automatic generation and parallelization of the data identifier for hardware capable of performing the parallel processing. Accordingly, the user is necessarily forced to perform the program transformation by devising the means for parallel processing and incorporating it explicitly in the program. Accordingly, any serial-type programs which are in possession of the user as resources can not be executed in parallel in the forms as they are, but recording of the programs so as to be oriented for the parallel processing as well as debugging is required. Moreover, every time the characteristics of hardware are changed, the instructions for the parallelization must be correspondingly altered in order to ensure valid utilization of the resource or otherwise the resources can not run on the other systems, giving rise problems in respect to the general utilization of the user programs.

SUMMARY OF THE INVENTION

An object of the present invention is to provide a compiling method which can easily and automatically parallelize the existing serial type programs without requiring intervention of the user by generating automatically the data identifier required for the automatic generation of codes for parallel processing which is attended with data send and receiving processings to be performed among the processors, and which method can generate the object codes with an enhanced efficiency without taking into account the characteristics in detail of hardware to thereby reduce the burden imposed on the user.

In view of the above object, there is provided according to an aspect of the present invention a compiling method for generating from a serial type source program described in a high level language the object codes to be executed in parallel by a parallel processor system which is composed of a plurality of processors assigned with respective identification numbers and in which inter-processor data transfer system for identifying the data for transfer by data identifier is adopted, wherein the source program for serial execution is first translated to programs to be executed in parallel. The inter-processor data transfer process is extracted from the flow of processings involved in executing the parallel execution type programs resulting from the above-mentioned translation, and all the inter-processor data transfer processings as extracted are attached with data identifiers in such a manner that no overlap takes place. For attaching the data identifiers without being accompanied by any overlap, such a function is determined which can assume values in one-to-one correspondence with more than one arguments selected from a number of the processors constituting the parallel processor system, the identification numbers of the processors destined for executing the parallel execution type programs, loop identification numbers in the parallel execution type programs, loop lengths, a number of the data transfer processings or the loop index number thereof included in a loop. The values of the above-mentioned function are made use of as the data identifiers.

According to the compiling method described above, the serial execution type program is parallelized with the data identifiers being automatically generated, whereby user can get rid of a burden of rewriting his or her program resource to those oriented for the parallel processor system, which means that the aimed object of the present invention ca be accomplished.

BRIEF DESCRIPTION OF THE DRAWINGS

FIG. 4 shows an example of source program to be processed by the compiler according to the invention;

FIG. 5 shows, by way of example, source programs generated by the compiler according to the invention which are to be executed by two processors;

FIG. 8 is a view showing, by way of example, contents of the PE data/inter-PE data send/receive table;

FIG. 11 shows, by way of example, general programs for given processors which programs are to be processed by the compiler according to the present invention;

FIG. 13 is a view showing a serial FORTRAN program for summation;

FIG. 14 shows source programs derived from the program shown in FIG. 13 and allocated to different processors, respectively;

FIG. 15 shows program corresponding to those shown in FIG. 14 after determination of the respective data identifiers (KEY);

FIG. 16 shows another example of the serial-type calculation program;

FIG. 17 is a view showing programs derived from the one shown in FIG. 16 and allocated to different processors, respectively; and FIG. 18 is a view showing programs corresponding to those shown in FIG. 17 after determination of the respective data identifiers (KEY)

DESCRIPTION OF THE PREFERRED EMBODIMENTS

Now, by referring to the accompanying drawings, the present invention will be described in detail in conjunction with exemplary embodiments on the assumption that the invention is applied to a FORTRAN compiler for a parallel processor system including a plurality of processors and a communication network for the data transfer among the individual processors.

Figure 2:
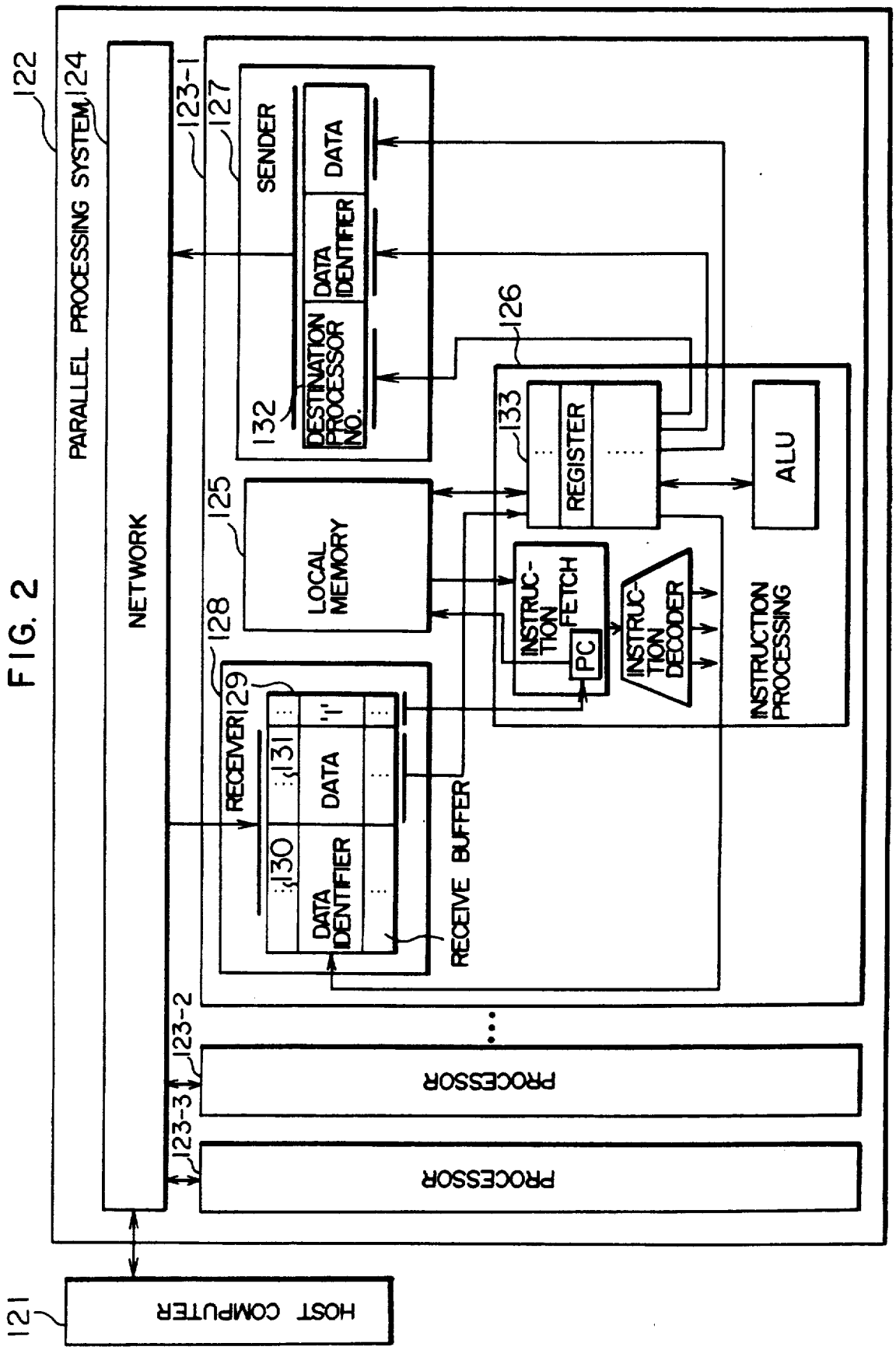
FIG. 2 is a schematic block diagram showing a general arrangement of a parallel computer system for executing programs generated by the compiler according to the invention.

FIG. 2 shows, by way of example, a parallel processor system to which the present invention can be applied. Although it is assumed that the illustrated parallel processor system includes no main storage shared for common use by the individual processors, it should be appreciated that the invention can equally be applied to a multiprocessor system which includes a main storage for common use. There are provided a plurality of processors operating in parallel and a network for use in common by the processors, as described hereinbefore. Accordingly, in conjunction with the data send/receive processings performed by the individual processors, it is necessary to ensure orderliness or definiteness (identity) of the data. The embodiment of the present invention described below is intended for generating such object codes which can ensure the definiteness or identity of the data when SEND/RECEIVE instructions for data transmission/reception are issued, so that the time involved for obtaining the result of computation can be reduced, while assuring effective utilization of the hardware resource.

Figure 3:
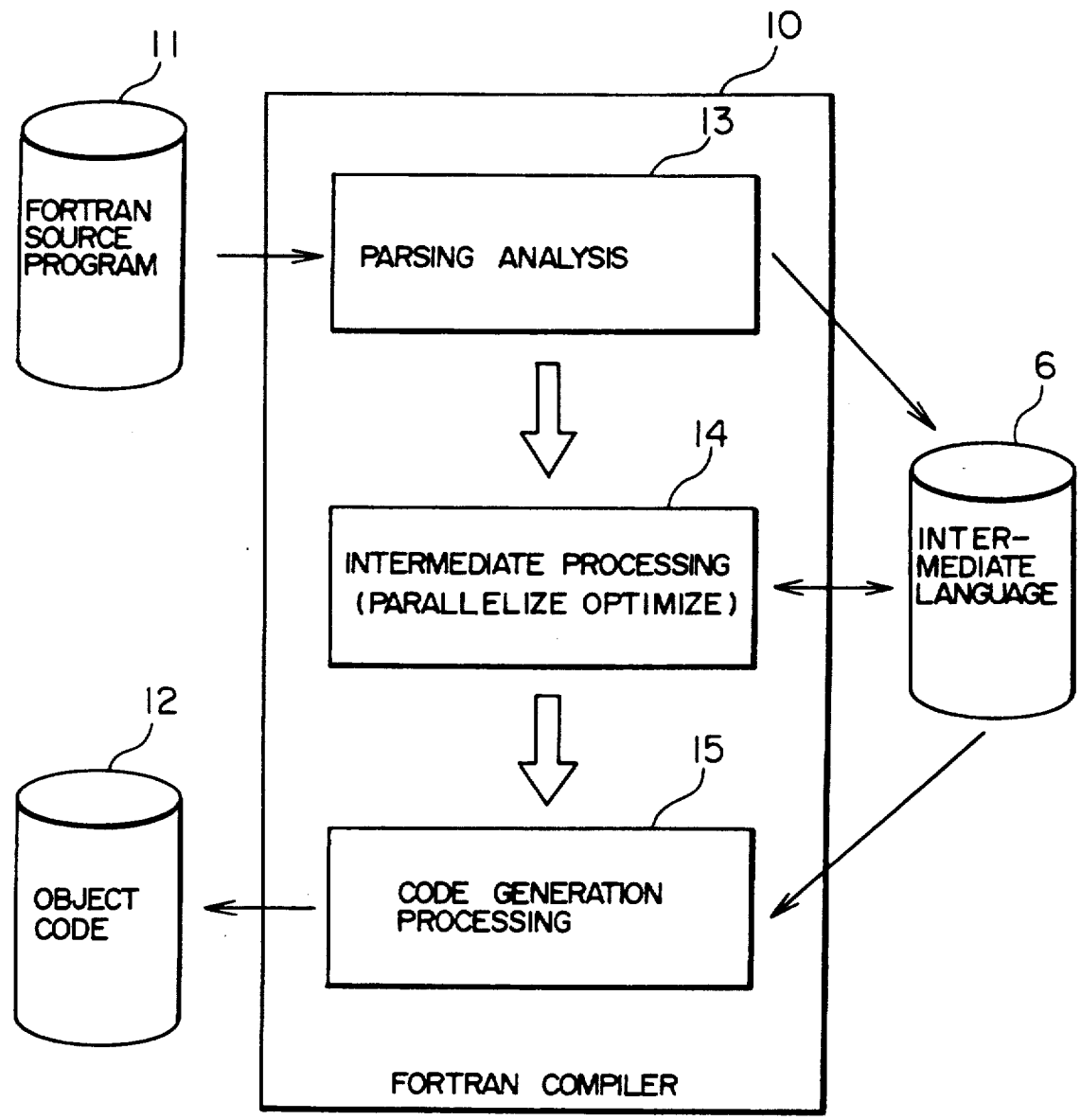
FIG. 3 is a schematic diagram showing generally a structure of the compiler for executing the processing shown in FIG. 1.

FIG. 3 shows a general arrangement of a whole compiler to which the present invention is applied. Referring to the figure, a FORTRAN source program 11 is inputted to a parsing processing 13 to be thereby translated into an intermediate language 6, which in turn is inputted to an intermediate processing 14 to undergo optimization and parallelization processings, whereby the intermediate language 6 is correspondingly altered or modified. A code generation processing 15 serves to generate the object codes to be executed in parallel from the modified intermediate language. The present invention concerns the intermediate processing 14 and aims to automatically generate the data required for the parallel execution of the object codes 12 while ensuring the identity of the data identifiers in the data transfer.

Figure 1:
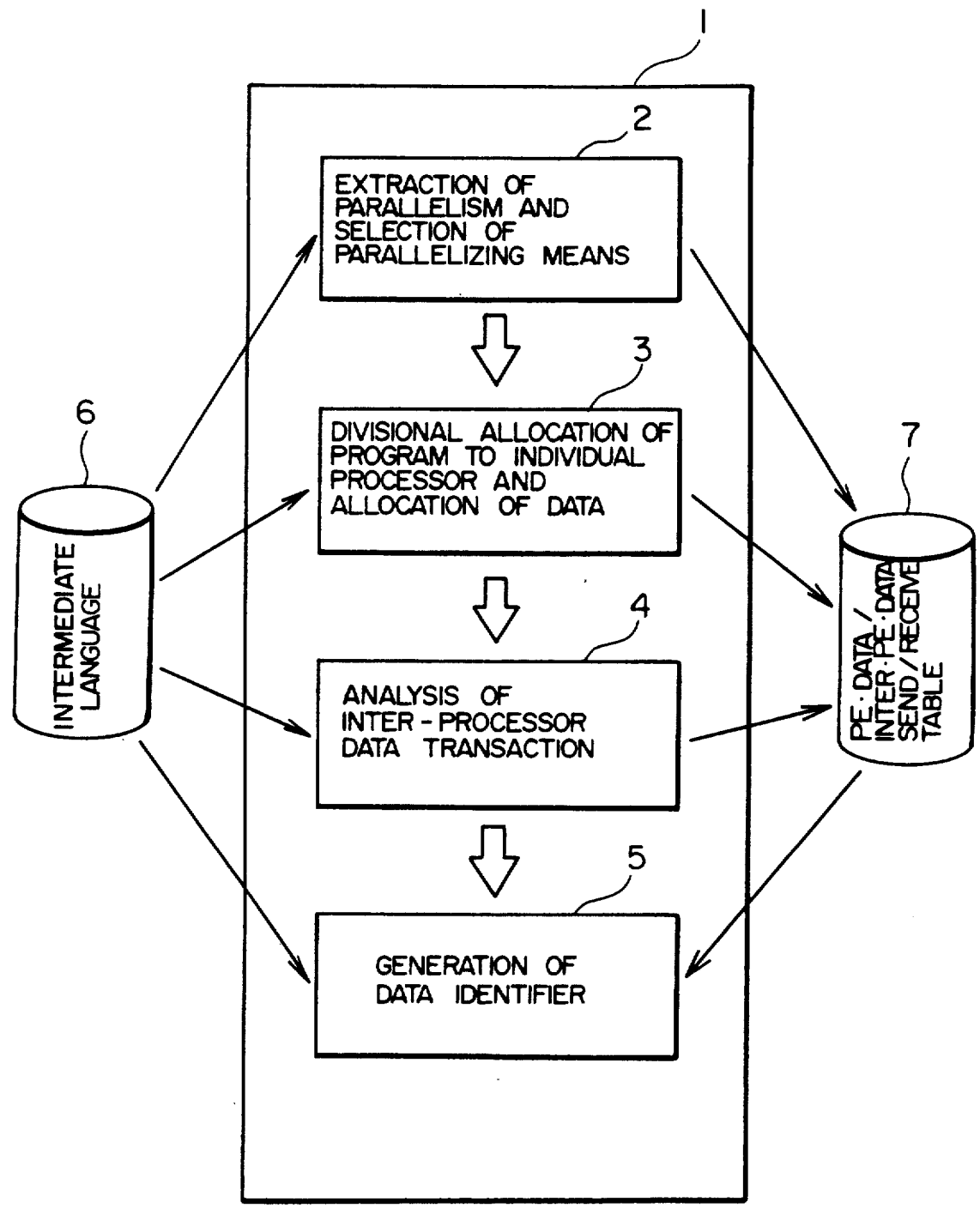
FIG. 1 is a flow chart showing a main portion of an automatic parallelization processing executed by a compiler according to an embodiment of the invention.
Figure 6:
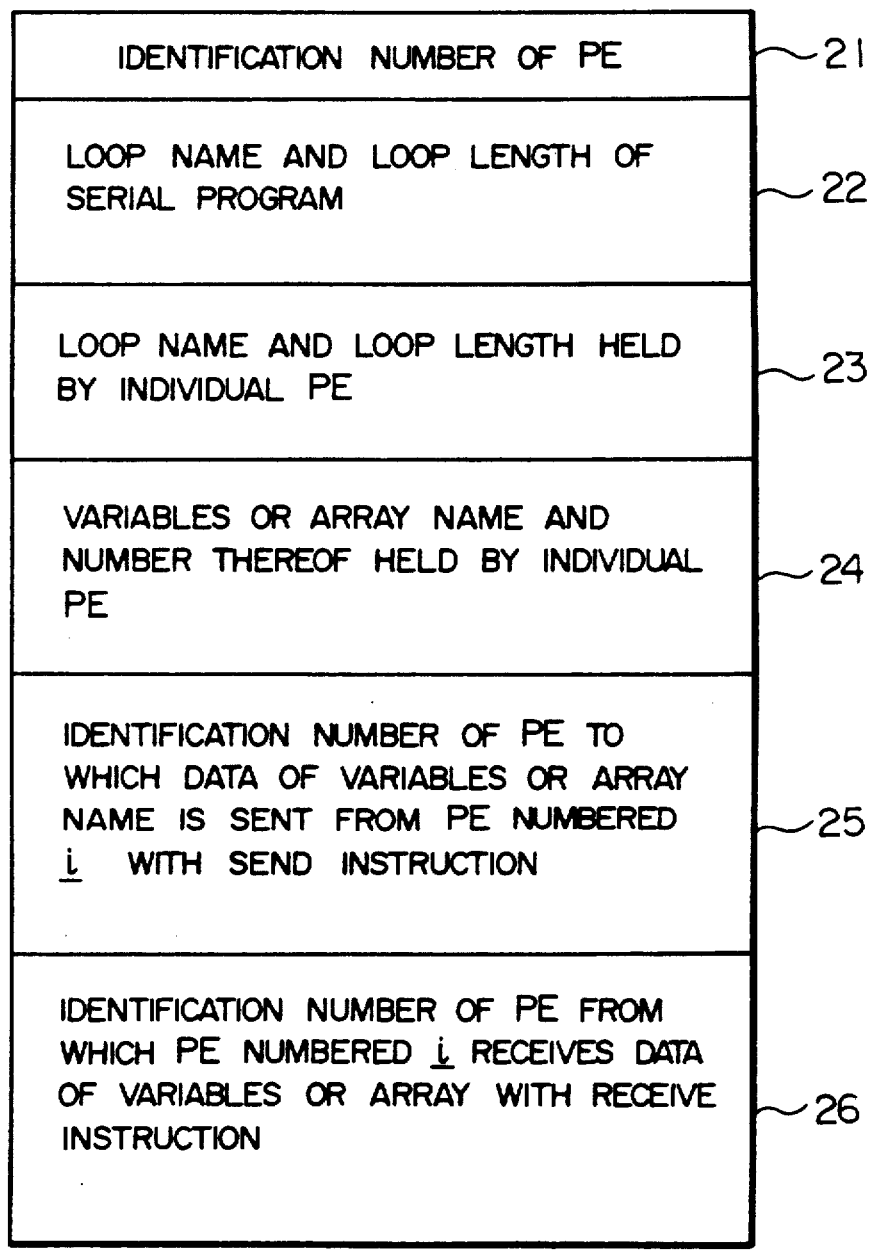
FIG. 6 shows a PE data/inter-PE data send/receive (transaction) table referred to in the course of executing the processing shown in FIG. 1.

In the intermediate processing 14 shown in FIG. 3, an arrangement of the processing relating to the automatic parallelization is illustrated in FIG. 1. As an example of the source program 11 inputted to the intermediate processing 14, there may be mentioned such a FORTRAN program as illustrated in FIG. 4. From the FORTRAN program shown in FIG. 4, the intermediate processing 14 prepares a loop table of "DO 10" loop (not shown) (in general, a table of multiple loops). Detection of parallelism, evaluation of operation complexity, granularity and multiplicity of loops as well as selection of the parallelizing means is performed through the processing 2 shown in FIG. 1 by analyzing the loop structure. Allocation of programs and data to the individual processors (also referred to as PE) is performed through the processing 3. Further, analysis of the number of data transferred between the processors by using the SEND/RECEIVE instructions for the data utilized for synchronization control, the PE identification number and other are performed in the processing 4. The results of the above-mentioned processings 2, 3 and 4 are written in a PE data/inter-PE data send/receive (transaction) table 7 shown in FIG. 6. As will be seen in this Figure, the table 7 holds on a PE basis the PE identification numbers, loop name and loop length, variables or array names, the number of variables possessed by each PE and data indicating how the data is to be transmitted to which of PEs from which of PEs or how data is to be received. The techniques described above can easily be realized by resorting to the known techniques disclosed, for example, in H. P. Zima et al. "SUPERB: The SUPRENUM Parallelizer", Bon University Research Report 861203, pp. 63–67 (1986).

Through the automatic parallelization processing, the serial-type program illustrated in FIG. 4 is translated to a parallel type program shown in FIG. 5. Although it is assumed that the number of the PEs is two in the case of the example illustrated in FIG. 5, it should be appreciated that the procedure according to the invention can equally apply to a system in which a greater number of PEs are employed. Referring to FIG. 5, the length of the "DO 10" loop of a statement 10 is maintained, as it is, in the processors PE-1 and PE-2. Operations in accordance with statements 17 and 18 are allocated to the processors PE-1 and PE-2, as indicated by corresponding statements 29 and 34. Since the data required by one of the processors is held by the other processor or PE, a SEND instruction is necessitated for sending the data required by the counterpart PE as with the case of the statements 28 and 33. In the statement 28, an operand "2" of the SEND instruction given by the statement 28 represents the identification number of the destination processor (i.e. PE-2) to which the data is to be sent, an operand "KEY" represents the data identifier which is to be determined and $A(I-1)$ represents the data to be sent. Analogy applies to the statement 33. On the other hand, in the case of the statement 29 which concerns the RECEIVE instruction, data can be received by designating only the data identifier KEY.

Since the SEND instruction and the RECEIVE instruction are issued in a pair in general, it is sufficient to determine the data identifier KEY for either one of both instructions, the data identifier KEY for the other instruction being then automatically determined.

Next, description will be made of the processing 5 (FIG. 1) for generating the data identifier KEY from the PE data/inter-PE data send/receive table 7 by referring to FIG. 7. In a processing step 270, the loop control variables in each PE are searched for the SEND instruction. In the case of the illustrated example, "I" represents the loop control variables in each PE. Subsequently, through the processing step 280, the variable or the array name to be sent is searched. In FIG. 8, there are illustrated the contents 7-1 and 7-2 of the table 7 for the processors identified with the PE numbers "PE-1" and "PE-2" As will be seen in FIG. 8, the array in the processor PE-1 is represented by A while it is represented B in the PE-2. In a processing step 290, the number of variables and the arrays in a loop (i.e. the number of times the SEND operation is to be performed) is counted. In the case of the illustrated example, this number is "1" in either processor of PE-1 or PE-2. Through a processing 300, the maximum number of the SEND instructions and the maximum value of the loop length in all the PEs are determined. In the PE-1 and PE-2, the maximum number of SEND instructions and the maximum value of the loop length are "N−1" and "1", respectively. Accordingly, when the loop control variable I varies, from the identification number of the PE which is to execute the SEND instruction or the identification number of the PE to which the SEND instruction is to be sent, the maximum loop length in each PE and the number of times the SEND operation is to be performed, the value of the KEY for ensuring the identity of the data identifier for all the PEs can be written in a general form as follows:

$$\begin{aligned}
KEY &= (PE\ No.) \times (Max.\ Value\ of\ I) + 1(I - 1) \\
&\quad \times (\text{Intra-Loop Max. Number of SEND}) \\
&\quad + (\text{Intra-Loop Number of SEND}) \\
&= n_{PE} \times (N - 1) \times 1 + (I - 1) + 1 \quad (1) \\
&= n_{PE} \times (N - 1) + I \quad (2)
\end{aligned}$$

where I varies in a range from "1" to "N−1". As the PE No. (the identification number of the processor), the identification number of the PE which is to execute the SEND instruction is selected. The symbol $n_{PE}$ represents the identification number of the PEs and assumes a value of "1" or "2" in the case of the illustrated embodiment. Generation of this function form is realized through a processing 310 (FIG. 7).

At this juncture, it should be mentioned that KEY assumes a value variable in a range from N to $2(N-1)$ for the processor PE-1, while the value of KEY for the processor PE-2 varies in a range from $2N-1$ to $3(N-1)$. These values are set as the data identifiers through a processing 320. The data identifiers can be definitely defined for all the PEs. Although the above description has concerned the determination of the data identifier for the SEND instruction, the data identifier for the RECEIVE instruction can automatically be determined through a processing 330 since there exists a RECEIVE instruction corresponding to the SEND instruction in view of the meaning of the statement.

Figure 9:
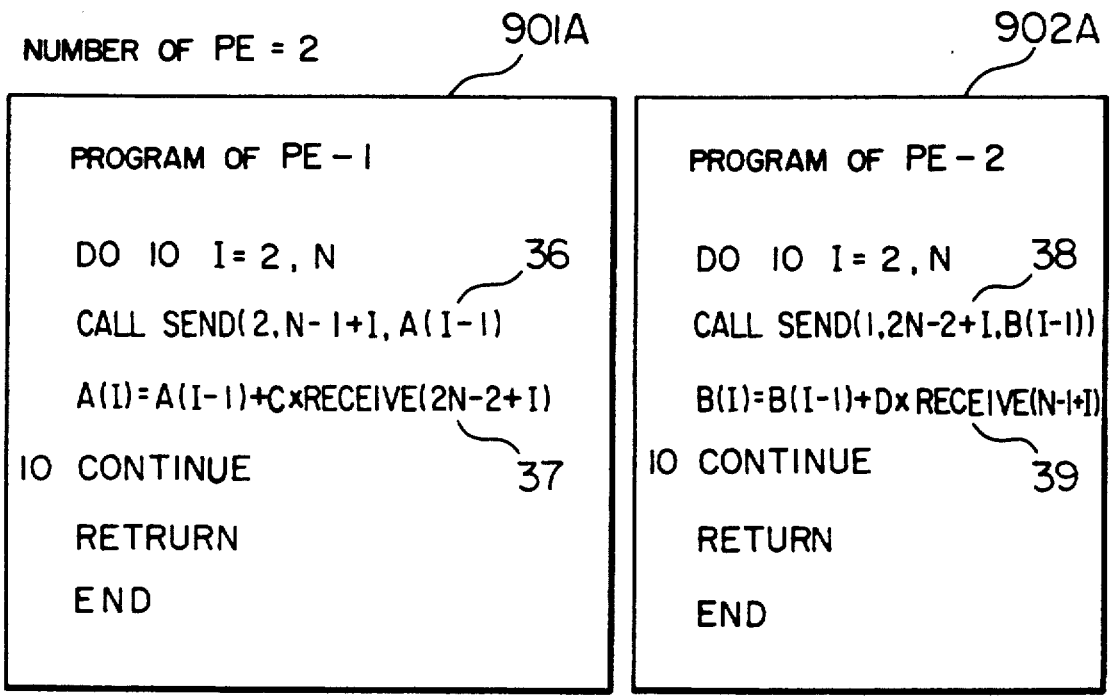
FIG. 9 shows source programs corresponding to those shown in FIG. 5 after determination of the values of the data identifiers (KEY) through the processing shown in FIG. 8.

Thus, "KEY" shown in FIG. 5 can be written as a program by using the loop control variable I of "DO 10" loop, as is illustrated in FIG. 9 at 901A and 902A. With the statement 36, the processor PE-1 sends the data having the data identifier depending on its identification number PE-1 to the processor PE-2. With the statement 37, the processor PE-1 receives the data having the data identifier depending on the identification number PE-2 by the RECEIVE instruction. Similarly, with the statement 38, the processor PE-2 sends to the processor PE-1 the data having the data identifier depending o the identification number of PE-2, while with the statement 39, the processor PE-2 receives the data having the data identifier depending on the identification number of PE-1 by the RECEIVE instruction.

The method of establishing definitely the values for the data identifiers for all the processors (PEs) can be generalized through the procedure described below.

Assuming that each PE has multiple loops in a general sense, wherein the number of intra-loop SENDs is represented by $n_1$, the number of inner loops J by $n_2$ and the number of the outer loops by $n_3$, then the number of SENDs is given by $1 < C < n_1$. Accordingly, by determining the value of the data identifier Key as follows:

$$Key = n_{PE} \cdot n_3 \cdot n_2 \cdot n_1 + I \cdot n_2 \cdot n_1 + J \cdot n_1 + C \quad (3)$$

$$1 \leq C \leq n_1$$

$$1 \leq J \leq n_2, \; 1 \leq I \leq n_3$$

the data identifier can be definitely determined for all the PEs. In more general, in case each PE has multiple loops in a number k, the data identifier Key can be determined in accordance with:

$$Key = n_{PE} \cdot n_{k+1} \cdot \ldots \cdot n_1 + I_k \cdot n_k \cdot \ldots$$
$$n_2 \cdot n_1 + I_2 n_2 n_1 + I_1 n_1 + C \quad (4)$$

$$1 \leq I_{k'} \leq n_{k'}(k' = 1, \ldots, k)$$

$$1 \leq C \leq n_1, \; 1 \leq n_{PE} \leq N_{pe}$$

where $n_k$ represents the loop length, $n_{PE}$ represents identification numbers of the PEs, and $N_{pe}$ represents the number of the PEs provided in the system.

It is however assumed that $I_{k'}(k' = 1, \ldots, k)$ is so modified in respect to the range of value that the first one of "DO" loops in the PE has assumes "1".

When the data identifier is used so as to be definite for all the PEs, the number of digits for describing the data identifier becomes excessively large, giving rise to a problem that overflow may take place. In order to evade this problem, the value of the data identifier should be as small as possible. Further, in case the data transfer (transmission and reception of data) is localized, common data identifiers should preferably be used on a group basis of PEs, if possible. Thus, it is also proposed according to a feature of the present invention that the same data identifier is used in common for a group of PEs. This can be realized so long as the identity (definiteness) of the data identifiers making appearance in the RECEIVE instructions can be ensured for a given group of PEs. This can be verified by tracing the data transfer by referring to the table 7 shown in FIG. 6. In the case of the illustrated example of program, it is clear that the data received by the processors PE-1 and PE-2 are those sent from the PE-2 and the PE-1 with the SEND instructions, respectively, as will be seen in FIG. 8. Accordingly, in this case, discrimination of the PE by $n_{PE}$ in the expression (1) is rendered unnecessary. Accordingly, the value of the data identifier KEY for both the processors PE-1 and PE-2 can be written without $n_{PE}$ as follows:

$$KEY = I$$

Figure 10:
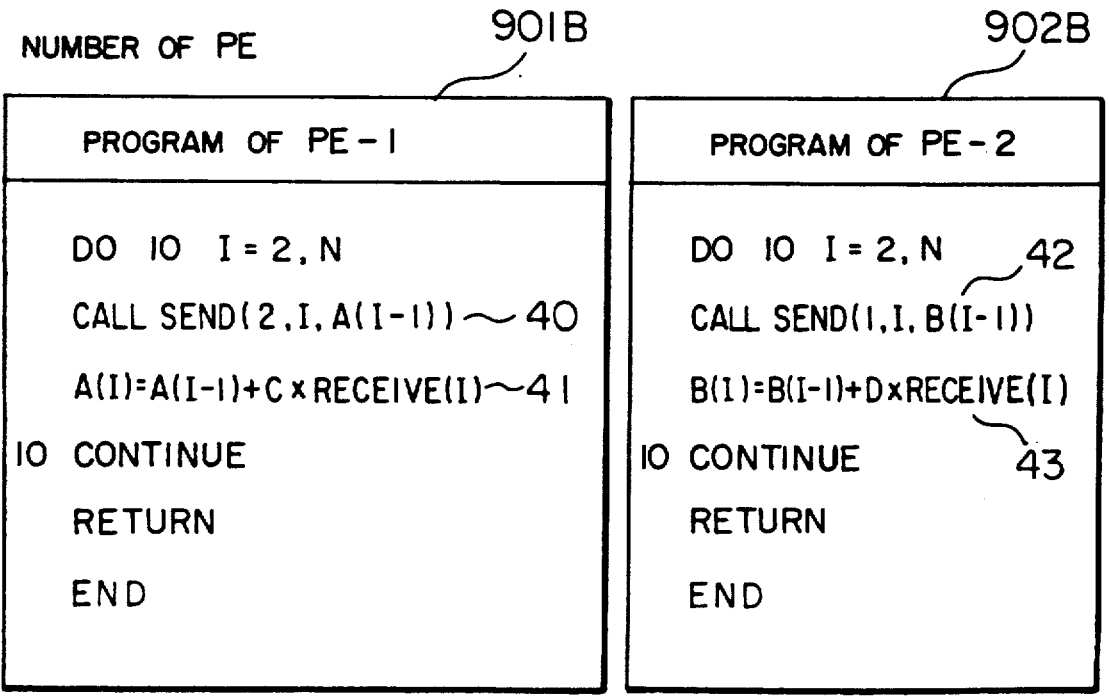
FIG. 10 shows source programs corresponding to those shown in FIG. 5 after determination of the values of the data identifiers (KEY) through the processing (FIG. 12) which differs from the one shown in FIG. 7.

Thus, it is possible to use the data identifier common to both the PE-1 and PE-2, as illustrated in FIG. 10. In fact, common data identifiers can be used for the statements 40 and 42 and the statements 41 and 43, respectively, regardless of difference in the PE identification number.

As will be understood from the foregoing, the data identifier can be definitely determined for all the PEs. Besides, the common data identifier can also be used on the group basis of PEs such that the data identifier of the data to be received under the RECEIVE instruction is definite for the receiving PEs.

Figure 12:
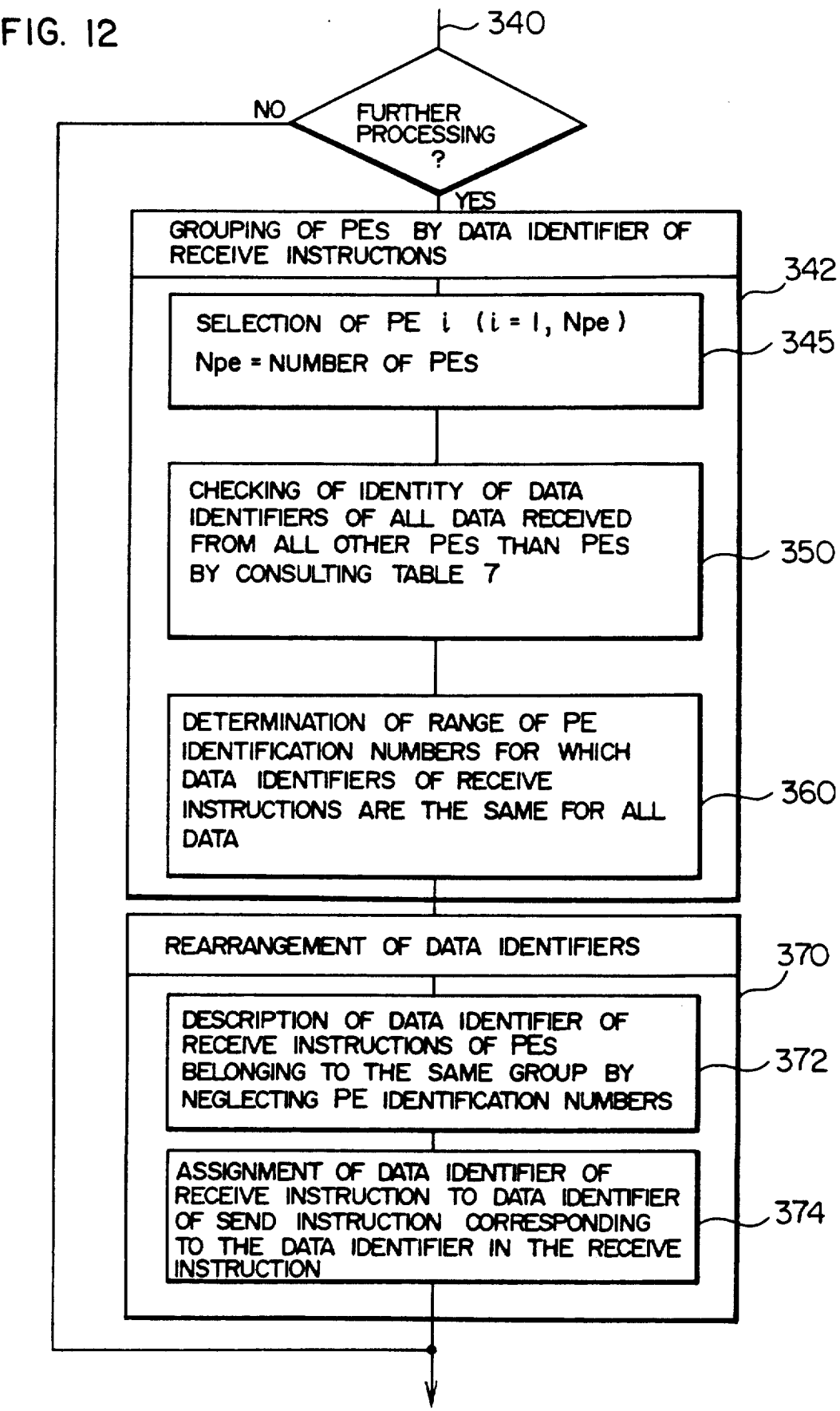
FIG. 12 is a flow chart illustrating the data identifier generation processing according to another embodiment of the present invention.

Next, referring to FIG. 12, description will be made of a processing through which the data identifier is differentiated only within a group of PEs while maintaining the identity only for the identifier of the RECEIVE instruction.

Figure 7:
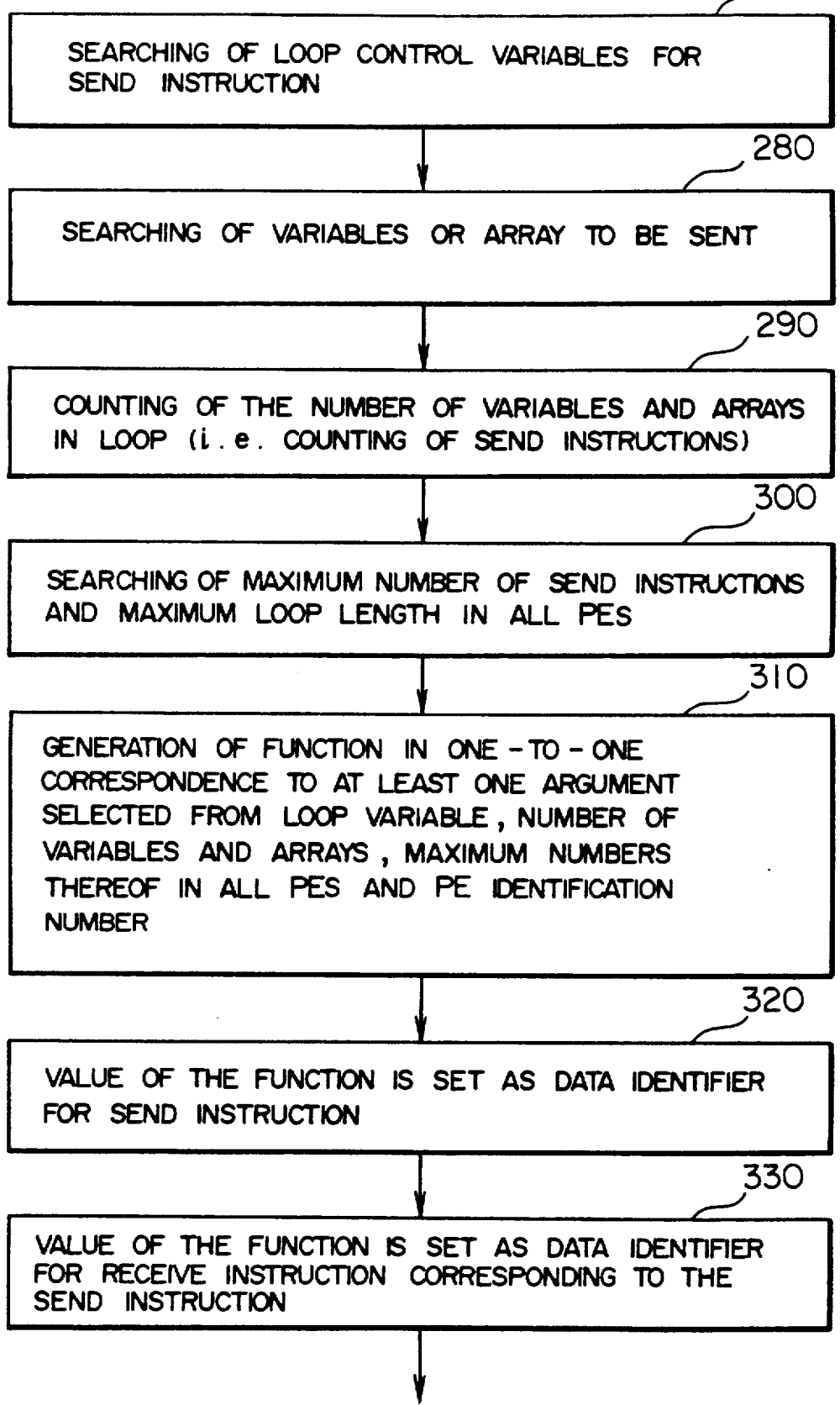
FIG. 7 is a flow chart illustrating a data identifier generation processing (5) shown in FIG. 1.

After completion of the processing 330 shown in FIG. 7, the data identifier assumes a definite value for all the PEs. When this state is passable, the data identifier assumes the value determined by the function obtained through the processing 310 as shown in FIG. 7 after having undergone the processing 380 shown in FIG. 12. However, in case the data identifier need not to be of a definite value for all the PEs but may be definite only within a certain group of PEs, the value of the data identifier can then be determined through the procedure mentioned below.

At first, one processor or PE (identified as the i-th PE) of a group is selected as the center PE and the state of reception from all the other PEs is checked by reference to the PE data/inter-PE data table 7. More specifically, in a processing 350, the data identifiers of all variables received by a given PE under the RECEIVE instruction are checked, being followed by a processing 360 where the group of such PEs for which the received data identifiers are of a definite value, inclusive of the data identifiers having no PE identification number, is searched. This procedure is repeatedly performed until the above-mentioned identification number i of the center PE has been sequentially assigned to all the PEs. In case a given PE should belong to two adjacent groups, it is presumed that the given PE belongs to that group in which the number i of the center PE as employed in the classification of PEs into groups is of a smaller value. Through the procedure described above, grouping of the PEs can be realized such that the data identifiers of RECEIVE instructions assume a definite value within each group of the PEs. Such groupwise classification of the PEs can be carried out regardless of whether the data identifier is determined statically or determined dynamically, so far as the definiteness of the RECEIVE instruction can be ensured.

After the PEs have been grouped in this manner, the data identifiers prepared in consideration of the identification numbers of the PEs are replaced by the data identifiers from which the PE identification numbers are omitted. The value of the data identifier to be used at that time is determined through a processing 310 in accordance with a function from which the PE identification number is omitted. In a processing step 370, the data identifiers in the SEND instructions for the same group of PEs are rewritten so as to comply with the data identifier in the RECEIVE instruction. Through the procedure described above, a number of PEs can have one and the same data identifier on the group basis. In other words, in each group of the PEs, the data identifier can be definitely determined.

In the foregoing, the loopwise organization has been assumed. The following description is directed to a non-looped structure.

The total number $n_i$ of the SEND instructions can be known for each identification number i of the PE from the table 7. Accordingly, the SEND instructions are counted over all the PEs and assigned with identification numbers, respectively, which are utilized as the data identifiers determined definitely for all the PEs.

As a method similar to the above, it is also possible to establish definitely the identifier KEY for all the PEs by determining the maximum value $n_{max}$ of the total number $n_i$ of the SEND instructions held by each PE and by using the PE number i (where $1 \leq i \leq N_{pe}$) through the procedure described below. The data identifier KEY is expressed as a function of such variables as the total number of the SEND instructions held by each PE and the identification numbers of the PEs as follows:

$$KEY = i \cdot n_{max} \times C$$

where $1 \leq C \leq n_{max}$ and $1 \leq i \leq N_{pe}$, $N_{pe}$ representing the number of the PEs.

Now, description will be made in conjunction with another exemplary embodiment of th invention.

Taking as an example another serial-type FORTRAN program, a method of attaching the data identifier will be described, only by way of example. FIG. 14 illustrates in what manner a serial summation program shown in FIG. 13 can be parallelized on the assumption that the number of processors or PEs is three. The program shown in FIG. 13 is so prepared as to sum up the data in a number of NS in an array A with the result being represented by S. The program shown in FIG. 14 has been parallelized through the processings 2, 3 and 4. At this stage, the value of the data identifier KEY has not yet been determined. An array A for the serial processing is divided into subarrays A1, A2 and A3. The processors determine the partial sums of the subarrays A1, A2 and A3, respectively, the results being furnished to the processors. In this case, a series of the processings shown in FIG. 7 are executed except for those concerning the loop by consulting the PE data/inter-PE data transaction table 7 to thereby determine the data identifier KEY through the processing 310, similarly to the case of the processing for the program including the loops. FIG. 15 shows the parallelized programs after determination of the data identifier KEY. Data transfer of the partial sum of each PE to the processor identified by the number 1 is performed by setting the identification number of the sender processor (PE) as the data identifier through the processing 310. Subsequently, the result of summation determined by the processor PE No. 1 is sent to the processors PE No. 2 and PE No. 3 by executing "DO 30" instruction shown in FIG. 14. In this case, the receiver processor's identification number is utilized as the data identifier KEY through the processing 310.

A method of attaching the data identifier according to still another embodiment of the invention will be described by taking as an example another serial-type FORTRAN program. FIG. 17 shows in what manner a serial-type calculation program illustrated in FIG. 16 is parallelized on the assumption that two processors (PE) are employed. The program shown in FIG. 16 is equivalent to the program shown in FIG. 4 and differs from the latter in that a loop "DO 20" is added. Namely, the program shown in FIG. 16 differs from the one shown in FIG. 4 in that a plurality of "DO" loops are provided. Taking as an example the program shown in FIG. 16, it is considered how the transfer processing in response to the RECEIVE instruction can be grouped within one and the same processor element. FIG. 17 shows a parallelized programs resulting from the processings 2, 3 and 4 executed for the program shown in FIG. 16. At this level, the value of the data identifier KEY is not determined yet. In this case, the processing for loop division is performed through a series of processing steps illustrated in FIG. 7 by consulting the PE data/inter-PE data transaction table 7 to determine the data identifier through the processing 310, 350, 360 and 370. FIG. 18 shows the parallelized program obtained after determination of the identifier.

Each processor (PE) can utilize the loop control variables I of "DO 10" and "DO 20" loops as the data identifier. Since the identifier I for the last RECEIVE instruction of the "DO 10" loop is equal to "100", while that of the first RECEIVE instruction of "DO 20" is "1" (i.e. I = "1"), overlapping of the RECEIVE instructions does not take place for the other control variables of "DO 10" and "DO 20". Accordingly, the data identifiers used in "DO 10" loop and "DO 20" loop can assume the same value in a range of "1" to "100", which means that the loop control variables of "DO 10" and "DO 20" can be used in common.

The program attached with the data identifier KEY then undergoes the optimization processing and others. In the FORTRAN program shown in FIG. 4, the object code 12 is generated through the code generating processing 15 shown in FIG. 3. FIG. 9 shows in what manner the object code is executed. As will be seen from the above, the serially executed type FORTRAN program including SEND and RECEIVE instructions is allocated to the individual processors (PE) as the codes attached with the data identifier to be thereby executed in parallel.

As will now be understand, it is possible according to the teachings of the invention to execute the conventional serial-type user programs by the parallel processing system. In this conjunction, it should also be mentioned that the object code executable within a reduced time with an enhanced efficiency can automatically be generated by utilizing effectively the hardware resource.

A parallel computer disclosed in Japanese Patent Application No. 63-17070 filed Jan. 29, 1988 (on which the counterpart U.S. application assigned to the present assignee Ser. No. 303,626 is being filed) implements a storage area for received data in a local memory as shown by 125 in FIG. 2 without using the receiving buffer 128, so that it is necessary to use an address of the local memory in order to identify a received data on the local memory. The address of the local memory is determined by the following formula, using a data identifier Address = Data Identifier × word length (for example, 4 or 8)

where the word length is the number of bytes of data transmitted or received. At this time, the entire local memory 125 is taken as the received data storage area. On the other hand, in order to provide the received data storage area as a part of the local memory, the address of the local memory may be made to satisfy the formula of Address = Data Identifier × Word Length + Specified Address where the specified address is predetermined.

Since the address of the local memory can be uniquely determined from the data identifier using these formulas, the address can be regarded as the data identifier. Therefore, the data identifier in the present invention includes such address.

What is claimed is:

1. A compiling method for generating object programs to be executed in parallel by a plurality of processors constituting a parallel computer from a serial type source program to be executed serially, comprising steps executed by an apparatus, the steps including:
   a) translating the serial type source program into a plurality of parallel type programs to be executed in parallel by different ones of said plurality of processors, each of the parallel type programs including i) a data send processing when first data produced by said each parallel type program is to be used by a different one of the processors, the data send processing sending the first data together with a data identifier, and ii) a data receive processing when second data used by said each parallel type program is produced by one of the processors, said data receive processing receiving the second data among data sent out from one of the processors by designating a second data identifier, wherein values of the first and second identifiers are yet to be determined;
   b) determining values of data identifiers used in data receive processings and data send processings included in said plurality of parallel type programs such that a pair of data identifiers employed in a pair of a data receive processing and a data send processing for same data correspond, while data identifiers employed in data receive processings and data send processings for different data, respectively, do not correspond for the different data; and,
   c) translating said plurality of the parallel type programs correspondingly to said object programs which use the determined values of the data identifiers.

2. The compiling method set forth in claim 1, wherein said determination includes the step of determining the values based upon a function which assumes a value in one-to-one correspondence with a combination of an identification number of a processor among said plurality of processors, a loop identification number and loop length both of each contained in the parallel type programs, and an identification number either of a data send processing or a data receive processing.

3. A compiling method a for generating object programs to be executed in parallel by a plurality of parallel processors constituting a parallel computer from a serial type source program to be executed serially, comprising steps executed by an apparatus, the steps including:
   a) translating the serial type source program into a plurality of parallel type programs to be executed in parallel by the parallel processors, each parallel type program including i) a data send processing when first data produced by said each parallel type program is to be sent to a first one of the parallel processors, the data send processing sending the first data to the first parallel processor with a first data identifier for the first data and ii) a data receive processing when second data used by said each parallel type program is sent from a second one of the parallel processors, said data receive processing designating a second data identifier for the second data, wherein values of the data identifiers for the first and second data are yet to be determined;
   b) grouping said plurality of parallel processors into a plurality of groups, wherein processors belonging to each group are determined so that any data sent by a data sending processing from a one parallel processor belonging to a one of said plurality of groups is directed to other parallel processors belonging to said one group but not to any parallel processor outside said one group;
   c) determining values of data identifiers to be employed for data handled in all of data receive processing and of data send processing included in a plurality of parallel type programs executed by each group such that a pair of data identifiers employed in a pair of data receive processing and a data send processing for same data match and such that data identifiers for different data employed in either a data receive processing or in a data send processing do not overlap; and,
   d) further translating said translated plurality of parallel type programs correspondingly to said object programs which use the determined values of the data identifiers.

4. The coupling method as set forth in claim 3, wherein said determination includes the step of determining the values based upon a function which assumes a value in one-to-one correspondence with a combination of an identification number of a parallel processor included in each processor group, a loop identification number and loop length both of each contained in each of parallel type programs to be executed in each processor group, and an identification number of either a send processing or data receive processing included in the each loop.

5. A method of operating a data processing apparatus to compile a serial-type compliable language source program into a plurality of simultaneously executable object program portions for respective execution by a plurality of parallel processors connected through a network forming a parallel processor system, each said parallel processor being assigned a single one object program portion and a unique identification label, the method comprising the steps of:
   translating the source program into a plurality of intermediate programs for parallel execution by said plurality of parallel processors;
   extracting inter-processor data transfer processes from an execution flow of each of the intermediate programs as data SEND processings each for sending a data items through the network, and data RECEIVE processings each for receiving a data item through the network;
   logically attaching a data identifier function as an intermediate data identifier to each of the data items sent according to the SEND processes and the data items received according to the RECEIVE processes;
   assigning a value to each intermediate data identifier according to a solution of the identifier function; and,
   transforming each of said plurality of intermediate programs into said plurality of simultaneously executable object program portions for respective execution using each of the assigned values.

6. The method according to claim 5 wherein the translating step further comprises the steps of:
   preparing a loop table within a storage of the data processing apparatus for recording a table of multiple loops within the source program for extraction of parallelism between the loops; and, allocating each of the plurality of intermediate programs among said plurality of parallel processors according to said loop table.

7. The method according to claim 6 wherein the attaching step comprises generating said data identifier function according to said identification label of each said parallel processor, a maximum loop length within each of the plurality of intermediate programs, and a number of times the data SEND program is executed by each of the intermediate programs.

* * * * *

UNITED STATES PATENT AND TRADEMARK OFFICE
CERTIFICATE OF CORRECTION

PATENT NO. : 5,088,034
DATED : February 11, 1992
INVENTOR(S) : Sigeo Ihara, et al.

It is certified that error appears in the above-identified patent and that said Letters Patent is hereby corrected as shown below:

Claim 3, column 11, line 46, delete the second occurrence of "a".

Claim 4, column 12, line 21, delete "coupling" and replace with --compiling--

Claim 4, column 12, line 28, after "type" insert --loop--.

Claim 4, column 12, line 30, delete "the".

Claim 5, column 12, line 33, delete "compliable" and replace with --compilable--.

Claim 7, column 14, line 3, delete "program" and replace with --process--.

Signed and Sealed this

Fourth Day of May, 1993

Attest:

MICHAEL K. KIRK

Attesting Officer

Acting Commissioner of Patents and Trademarks